United States Patent
Chane-Waye et al.

(10) Patent No.: US 7,281,442 B2
(45) Date of Patent: Oct. 16, 2007

(54) PLANETARY GEAR REDUCTION MECHANISM IN PARTICULAR FOR MOTOR VEHICLE STARTER AND STARTER EQUIPPED WITH SAME

(75) Inventors: Olivier Chane-Waye, Lyons (FR); Zeng Gang Liu, Maurecourt (FR)

(73) Assignee: Valeo Equipements Electriques Moteur, Creteil (FR)

(*) Notice: Subject to any disclaimer, the term of this patent is extended or adjusted under 35 U.S.C. 154(b) by 301 days.

(21) Appl. No.: 10/487,954

(22) PCT Filed: Sep. 16, 2002

(86) PCT No.: PCT/FR02/03137
§ 371 (c)(1),
(2), (4) Date: Oct. 4, 2004

(87) PCT Pub. No.: WO03/025423
PCT Pub. Date: Mar. 27, 2003

(65) Prior Publication Data
US 2005/0028619 A1   Feb. 10, 2005

(30) Foreign Application Priority Data
Sep. 14, 2001 (FR) .................... 01 11929

(51) Int. Cl.
F02N 15/02 (2006.01)
F02N 15/04 (2006.01)
F02N 15/06 (2006.01)
(52) U.S. Cl. ............... 74/7 E; 74/411
(58) Field of Classification Search ......... 74/7 A–7 E, 74/7 R, 6, 411, 410, 443, 8, 9; 475/290, 475/291, 317, 318; 290/1 C, 38 R; 310/51
See application file for complete search history.

(56) References Cited

U.S. PATENT DOCUMENTS

| | | | | |
|---|---|---|---|---|
| 4,503,719 A | * | 3/1985 | Hamano | 74/7 E |
| 5,323,663 A | * | 6/1994 | Ohgi et al. | 74/7 E |
| 5,718,147 A | * | 2/1998 | Clerc-Roch et al. | 74/7 E |
| 5,905,310 A | * | 5/1999 | Nagao | 290/46 |
| 6,089,112 A | * | 7/2000 | Kelly et al. | 74/7 C |
| 6,664,652 B2 | * | 12/2003 | Chane-Waye | 290/38 R |

FOREIGN PATENT DOCUMENTS

| | | |
|---|---|---|
| EP | 0 622 557 A1 | 11/1994 |
| FR | 1 222 610 A | 6/1960 |

* cited by examiner

*Primary Examiner*—Richard Ridley
*Assistant Examiner*—James Pilkington
(74) *Attorney, Agent, or Firm*—Berenato, White & Stavish

(57) ABSTRACT

A reduction gearbox with an epicyclic gear train is provided for a motor vehicle starter. This gearbox includes a crown (30) comprising a outer crown part (31) and an inner crown part (32) carrying an internal set of teeth (33) together with shock absorbing elements (34). The the damping elements (34) are made in the form of plates disposed in seatings which consist of complementary recesses (36, 37) formed respectively in an outer peripheral face (38) of the inner crown part (32) and in an inner peripheral face (39) of the outer crown part (31). Each recess has a depth which increases in a direction of relative angular displacement between the two crown parts, considered from the peripheral surface, over a length (a) which corresponds to the length of the plate, to a value (b) which is substantially equal to the thickness of the plate.

7 Claims, 3 Drawing Sheets

PLANETARY GEAR REDUCTION MECHANISM IN PARTICULAR FOR MOTOR VEHICLE STARTER AND STARTER EQUIPPED WITH SAME

TECHNICAL FIELD OF THE INVENTION

This invention relates to a reduction gearbox with an epicyclic gear train, especially for a motor vehicle starter, of the type including a crown which comprises an outer crown part fixed in the carcass of the starter, and an inner crown part which is mounted coaxially in the outer part and which carries an internal set of teeth in mesh with the planet wheels of the reduction gear train, together with shock-absorbing damping elements which are interposed between the abutment faces formed on the inner peripheral face of the outer crown part and the outer peripheral face of the inner crown part, and a starter equipped with such a reduction gearbox.

STATE OF THE ART

A reduction gearbox with an epicyclic gear train for a motor vehicle starter, of this type, is known from U.S. Pat. No. 4,503,719. That starter has the major drawback that the damping blocks are put not only in compression but also in distortion, which considerably reduces their useful life.

OBJECT OF THE INVENTION

The object of the present invention is to overcome this drawback.

To achieve this object, the reduction gearbox according to the invention is characterised in that the damping elements are made in the form of plates disposed in seatings which consist of recesses of complementary form, formed respectively in the outer peripheral face of the inner crown part and in the inner peripheral face of the outer crown part, each recess having a depth which increases in a direction of relative angular displacement between the two crown parts, considered from the peripheral surface, to a value which is substantially equal to the thickness of the plate.

According to a feature of the invention, there are as many recesses and plates oriented in one direction of relative angular displacement as there are recesses and plates oriented in the other direction of angular displacement.

The starter according to the invention is characterised in that it includes a reduction gearbox according to the invention.

BRIEF DESCRIPTION OF THE DRAWINGS

The invention will be understood more clearly, and other objects, features, details and advantages of it will appear more clearly in the following explanatory description with reference to the attached diagrammatic drawings, which are given by way of example only and which illustrate one embodiment of the invention, and in which.

DETAILED DESCRIPTION OF PREFERRED EMBODIMENTS OF THE INVENTION

Figure 1:
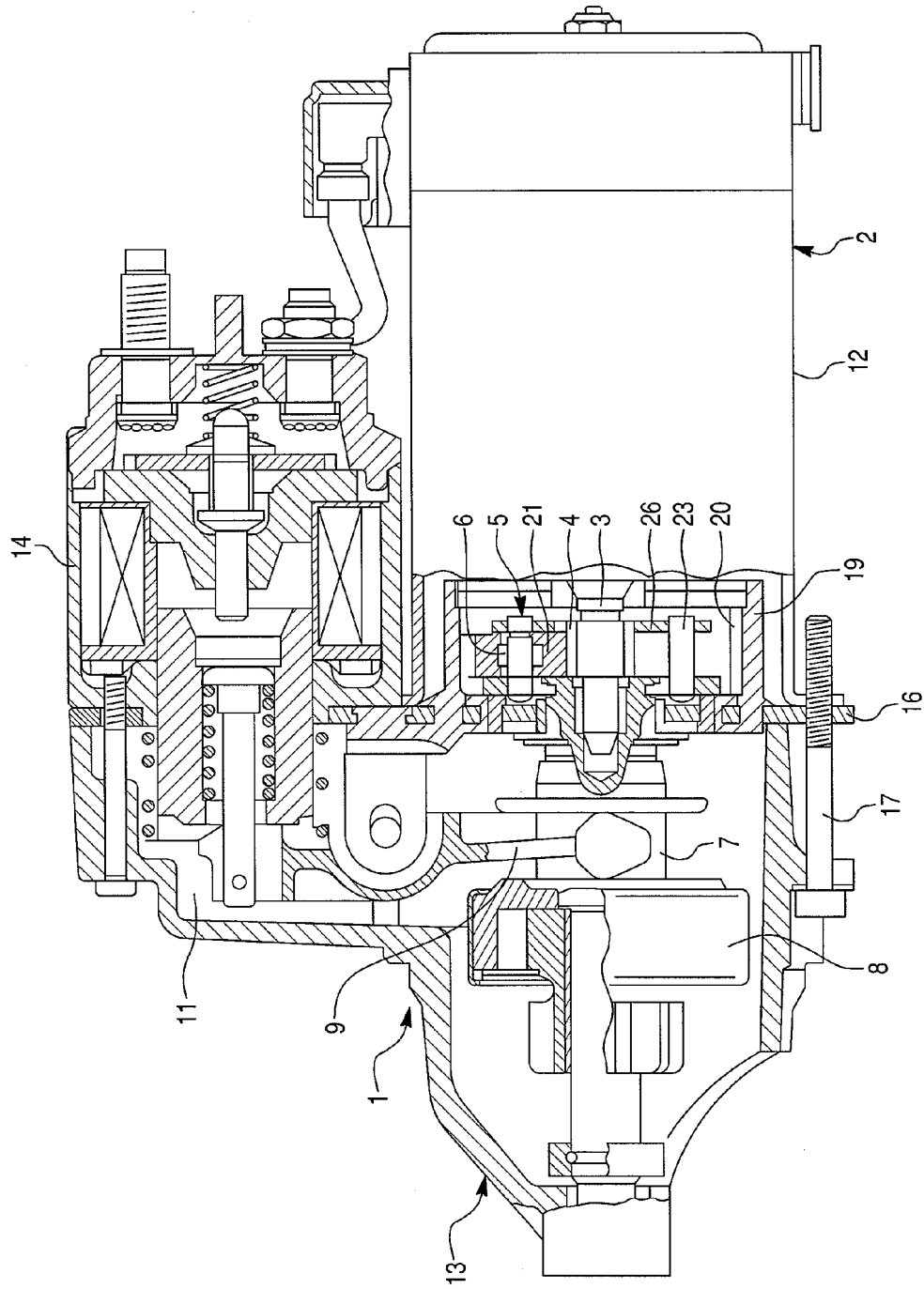
FIG. 1 is a view in partial axial cross section of a starter of the type having an epicyclic reduction gearbox in the state of the art.

With reference to FIG. 1, a motor vehicle starter 1 of the type having an epicyclic gearbox in the state of the art will first be described, in order to demonstrate the general structure of a starter which incorporates the reduction gear crown arrangement according to the invention.

In FIG. 1, a known starter 1 comprises an electric motor 2 which includes an armature that drives a shaft 3, which carries a pinion 4 at its free end. A reduction gearbox 5, having an epicyclic gear train 6, is interposed between the pinion 4 and an actuator shaft 7 which is coaxial with the output shaft 3 of the electric motor 2, the actuator 8 being displaceable on the shaft 7 by means of a lever 9, in the form of a fork, of an electromagnetic contactor 11 which is disposed in the upper part of the starter. The electric motor 2 and the reduction gearbox are enclosed within a carcass 12, to which there is fixed a front part, in the form of a shroud 13 on which the casing 14 of the contactor 11 is also mounted.

The reduction gearbox 5 includes a base plate 16 which is fixed on the carcass 12 and casing 14 by means of screws 17, which fasten the shroud 13 on the carcass 12 and casing 14, together with a crown 19 which is formed by in situ moulding on the base plate 16 in the starter shown.

The crown 19 includes an internal set of teeth 20 with which satellite, or planet, wheels 21 of the epicyclic gear train 6 are in mesh. The planet wheels 21 are mounted on spindles 23 which are carried by a satellite carrier plate 25, which is fixed with respect to the actuator shaft 7 for rotation with it, and which is immobilized axially against straight line motion by a plate 26 which is force-fitted on the satellite spindles 23.

The invention is specifically concerned with the construction of the crown in a reduction gearbox, in particular for a starter of the type shown in FIG. 1.

Figure 2B:
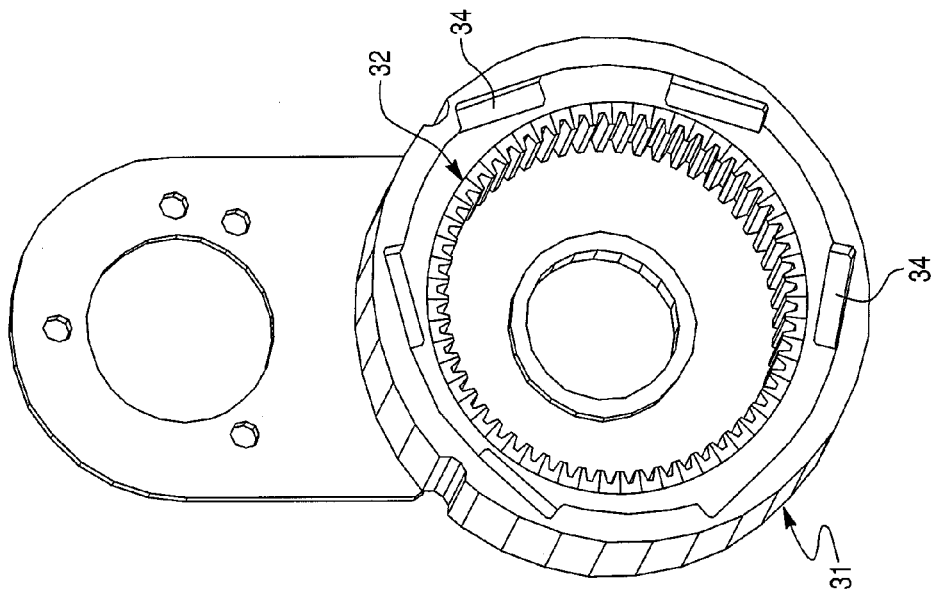
FIGS. 2A and 2B show a reduction gearbox according to the invention, in an exploded perspective view and in the assembled state, respectively.
Figure 2A:
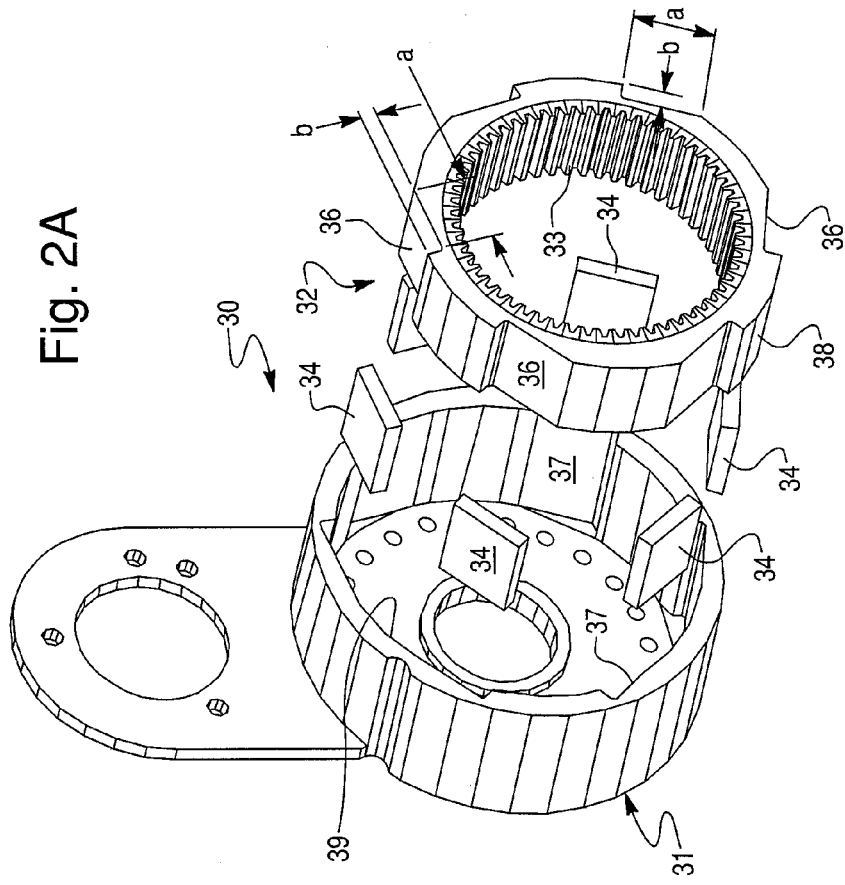

As can be seen in FIGS. 2A and 2B, such a crown, which is here designated by the reference numeral 30, is made in two parts, namely an outer part 31, which constitutes a housing, and an inner crown member 32, which is mounted coaxially within the crown housing 31 and is provided with an internal set of teeth 33 which are in mesh with the planet wheels of the reduction gear. In the example shown, six elements 34 of a shock absorbing material such as, for example, rubber or an elastomer, are interposed between the housing 31 and the inner crown member 32.

Each damping element 34 is made in the form of a plate, which is placed in a seating consisting of two recesses 36, 37 of complementary forms which are formed, respectively, in a radially outer peripheral face 38 of the inner crown member 32 and a radially inner peripheral face 39 of the housing 31. Each recess 36, 37 is so configured that its depth progressively increases in the peripheral direction, that is to say in the direction of relative angular displacement between the housing and the crown, considered from the corresponding surface over a length (a), up to a value (b) which is substantially equal to the thickness of the clamping plate 34, the length of the recess being substantially equal to the dimension of the plate in that direction. Each of the seatings formed between the recesses 36, 37 comprises a first pair of opposite plane faces 36', 37' corresponding to the length (a), and a second pair of opposite plane faces 36", 37" corresponding to the thickness (b) and different from the first pair 36', 37'. It will be seen that there are the same number of recesses 36, 37 and plates 34 that are oriented in one direction of angular displacement, as there are oriented in the other direction. Consequently the damping effect is the same in both directions of relative angular displacement between the housing and the inner crown.

Given that the damping elements 34 are positioned tangentially with respect to the two reduction gear parts 31, 32, they work in compression and not in distortion, which considerably increases their useful life.

Figure 2C:
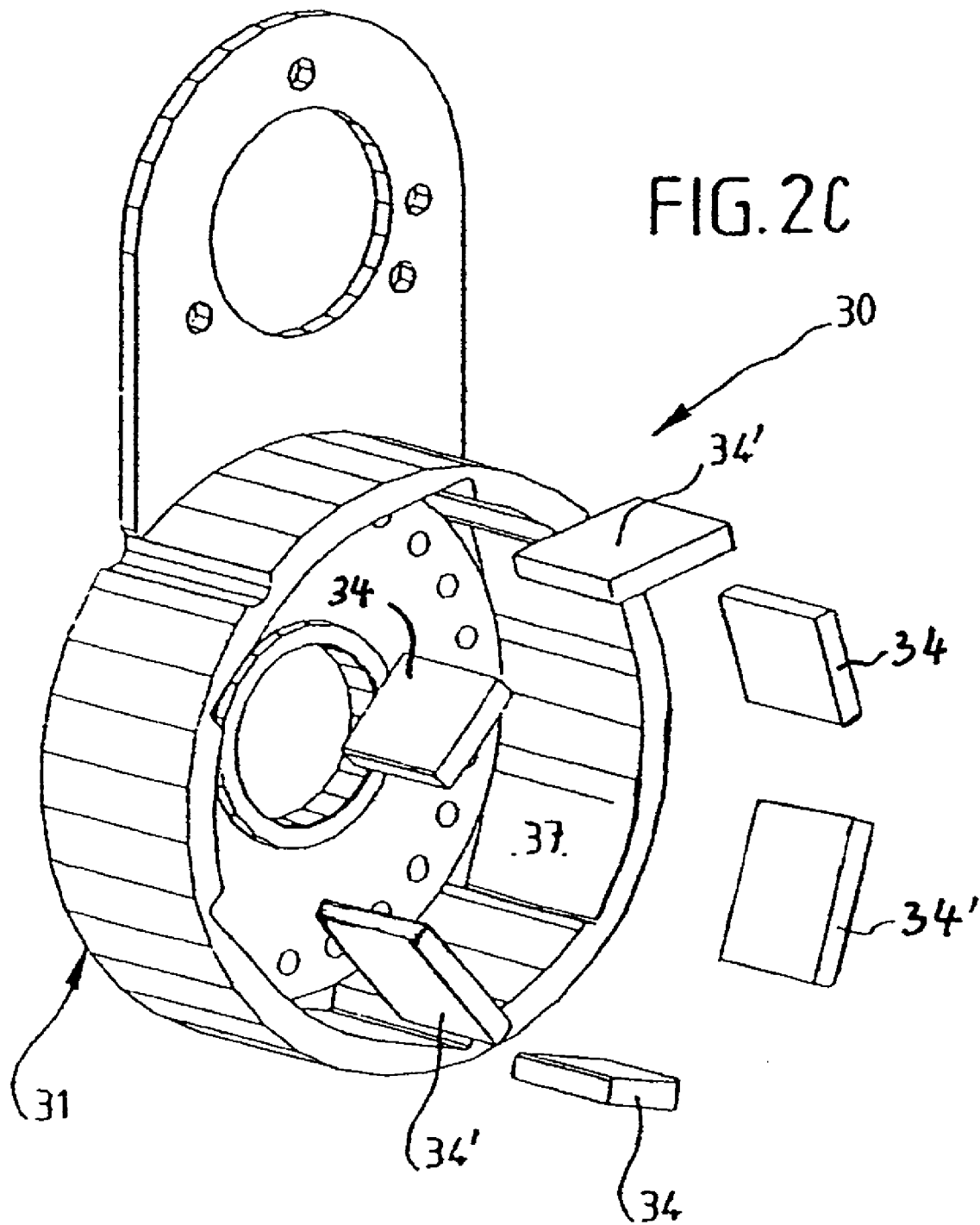
FIG. 2C is a partial exploded perspective view of an alternative embodiment of the reduction gearbox according to the present invention.

It is also to be noted that the damping plates 34 that are oriented in the same circumferential direction may have a different length from those of the plates oriented in the other direction (the damping plates having one length shown as 34, while the damping plates having different length shown as 34'), as illustrated in FIG. 2C. The greater length is attributed to the plates which are located in the opposite direction from the direction of rotation of the electric motor, that is to say in the direction of shocks.

The invention claimed is:

1. A reduction gearbox for a motor vehicle starter, the gearbox comprising:
    a crown including:
        an outer crown part having a radially inner peripheral face and at least one first recess formed on the radially inner peripheral face, and
        an inner crown part mounted coaxially in the outer crown part and provided with an internal set of teeth in mesh with the planet wheels of the reduction gearbox the inner crown part having a radially outer peripheral face and at least one second recess formed in the radially outer peripheral face,
    at least one seating formed between the first and second recesses, the at least one seating being provided with at least one abutment face,
    at least one shock-absorbing damping element having a length and thickness and disposed in the at least one seating,
    each recess having a depth measured radially which increases in a direction of relative angular displacement between the two crown parts along the corresponding radially peripheral face, to a value substantially equal to the thickness of the damping element so that the at least one seating has a thickness and a length substantially equal respectively to the thickness and the length of the damping element.

2. The reduction gearbox according to claim 1, wherein the gearbox comprises as many recesses and damping elements oriented in one direction of the relative angular displacement as there are recesses and damping elements oriented in the other direction of the relative angular displacement.

3. The reduction gearbox according to claim 1, wherein the gearbox comprises a plurality of damping elements having the same said length.

4. The reduction gearbox according to claim 1, wherein the gearbox comprises a plurality of damping elements, and wherein the damping elements oriented in one direction along the corresponding radially peripheral face have lengths different from that of the damping elements oriented in the other direction along the corresponding radially peripheral face, the greater of the lengths being attributed to the plates damping elements oriented in a reverse direction of rotation of an electric motor of the starter.

5. A motor vehicle starter equipped with a reduction gearbox according to claim 1.

6. The reduction gearbox according to claim 1, wherein the at least one damping element is in the form of a plate.

7. A reduction gearbox for a motor vehicle starter, the gearbox comprising:
    a crown including:
        an outer crown part having a radially inner peripheral face and at least one first recess formed on said radially inner peripheral face; and
        an inner crown part mounted coaxially in the outer crown part and provided with an internal set of teeth in mesh with planet wheels of the reduction gearbox, the inner crown part having a radially outer peripheral face and at least one second recess formed on said outer peripheral face;
    at least one seating formed between the first and second recesses; and
    at least one shock-absorbing damping element;
    wherein the seating comprises a first pair of opposite plane faces and a second pair of opposite plane faces different from the first pair.

* * * * *